(12) United States Patent
Kim

(10) Patent No.: US 11,685,222 B2
(45) Date of Patent: Jun. 27, 2023

(54) STABILIZER BAR CONTROL APPARATUS AND METHOD

(71) Applicant: HYUNDAI MOBIS CO., LTD., Seoul (KR)

(72) Inventor: Cheol Joong Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 411 days.

(21) Appl. No.: 16/898,349

(22) Filed: Jun. 10, 2020

(65) Prior Publication Data

US 2021/0061052 A1 Mar. 4, 2021

(30) Foreign Application Priority Data

Aug. 30, 2019 (KR) .......................... 10-2019-0107189

(51) Int. Cl.
*B60G 21/055* (2006.01)

(52) U.S. Cl.
CPC .... *B60G 21/0556* (2013.01); *B60G 2202/135* (2013.01); *B60G 2204/62* (2013.01); *B60G 2400/104* (2013.01); *B60G 2400/204* (2013.01); *B60G 2400/41* (2013.01); *B60G 2400/44* (2013.01); *B60G 2400/821* (2013.01)

(58) Field of Classification Search
CPC ............ B60G 21/0556; B60G 21/0558; B60G 2204/62; B60G 2400/104; B60G 2400/204; B60G 2400/41; B60G 2400/44
See application file for complete search history.

(56) References Cited

U.S. PATENT DOCUMENTS

| | | | | |
|---|---|---|---|---|
| 4,648,620 | A * | 3/1987 | Nuss | B60G 21/0556 280/5.511 |
| 5,790,966 | A * | 8/1998 | Madau | B60G 17/0162 180/443 |
| 6,481,732 | B1 * | 11/2002 | Hawkins | B60G 17/0162 280/124.106 |
| 2002/0130481 | A1 * | 9/2002 | Fader | B60G 21/0556 280/124.164 |
| 2006/0212199 | A1 * | 9/2006 | Urababa | B60G 21/0555 701/38 |

(Continued)

FOREIGN PATENT DOCUMENTS

| | | | | |
|---|---|---|---|---|
| EP | 1893429 B1 * | 5/2010 | ......... | B60G 17/0162 |
| JP | S63-279917 | 11/1988 | | |

(Continued)

*Primary Examiner* — Frank B Vanaman
(74) *Attorney, Agent, or Firm* — H.C. Park & Associates, PLC

(57) ABSTRACT

An apparatus for controlling a stabilizer bar including: a steering angular velocity detection unit configured to detect a steering angular velocity of a vehicle in operation; a steering angle detection unit configured to detect a steering angle of the vehicle; and a control unit configured to determine whether the vehicle is turning, based on the steering angular velocity information and the steering angle information of the vehicle, and perform clutch coupling by driving a clutch of a stabilizer bar having the clutch applied thereto, when it is determined that the vehicle is turning. The control unit decides a clutch coupling time period in response to an instantaneous turning velocity of the vehicle, and performs the clutch coupling in response to the decided clutch coupling time period.

17 Claims, 19 Drawing Sheets

(56) References Cited

U.S. PATENT DOCUMENTS

| | | | | |
|---|---|---|---|---|
| 2007/0018414 A1* | 1/2007 | Yasui | ................ | B60G 21/0558 |
| | | | | 280/5.511 |
| 2008/0314714 A1* | 12/2008 | Beetz | .................... | F16D 25/061 |
| | | | | 192/108 |
| 2011/0208391 A1* | 8/2011 | Mizuta | ............... | B60G 21/0555 |
| | | | | 701/37 |
| 2019/0184784 A1* | 6/2019 | Park | .................. | B60G 21/0556 |

FOREIGN PATENT DOCUMENTS

| | | |
|---|---|---|
| JP | 2007-091099 | 4/2007 |
| JP | 2007-168716 | 7/2007 |
| KR | 10-2008-0015 | 2/2008 |

* cited by examiner

Prior Art

STABILIZER BAR CONTROL APPARATUS AND METHOD

CROSS-REFERENCE TO RELATED APPLICATION

This application claims priority from and the benefit of Korean Patent Application No. 10-2019-0107189, filed on Aug. 30, 2019, which is hereby incorporated by reference for all purposes as if set forth herein.

BACKGROUND

Field

Exemplary embodiments of the present invention relate to an apparatus and method for controlling a stabilizer bar, and more particularly, to an apparatus and method for controlling a stabilizer bar, which can decide a clutch coupling time period of a stabilizer bar when clutch coupling is required according to on a road condition and depending on a turning degree, and control a coupling position of the clutch in response to the clutch coupling time period, thereby preventing noise and vibration.

Discussion of the Background

In general, a roll which occurs when a vehicle makes a turn contributes to degradation of the stability of the vehicle. In a severe case, the vehicle may roll over.

In order to prevent such a roll of the vehicle, a stabilizer bar may be used to apply stiffness to the vehicle body when a difference occurs between the left and right heights of the vehicle, thereby reducing the roll.

However, the difference between the left and right heights of the vehicle may occur when the vehicle travels on an irregular road as well as when the vehicle makes a turn. In this case, the stiffness of the entire suspension may be increased to contribute to degradation of the ride quality.

A stabilizer bar with a clutch applied thereto is a system which is configured by applying a clutch to the middle of an existing stabilizer bar, and varies the roll stiffness of the vehicle by coupling and releasing the clutch according to a traveling condition. For example, when the vehicle makes a turn, the stabilizer bar may couple the clutch to have relatively high roll stiffness, thereby securing the driving stability of the vehicle. Furthermore, when the vehicle travels off-road, the stabilizer bar may release the clutch to lower the left/right roll stiffness, thereby securing a comfortable ride.

FIG. 1 is a diagram illustrating a conventional stabilizer bar with a clutch applied thereto. In the conventional stabilizer bar having a clutch applied thereto, the clutch can be coupled only at a specific angle, because a different tooth form is applied to the clutch.

Therefore, in the conventional stabilizer bar of FIG. 1, the clutch cannot be coupled and released while the vehicle is turning, and the stabilizer bar at either end can be operated only under a predetermined condition, for example, while the vehicle is stopped. In this case, the stiffness of the stabilizer bar may not be actively changed according to changing driving conditions, thereby degrading the ride quality and steering stability according to the driving conditions.

The above information disclosed in this Background section is only for enhancement of understanding of the background of the invention and, therefore, it may contain information that does not constitute prior art.

SUMMARY

Exemplary embodiments of the present invention provide an apparatus and method for controlling a stabilizer bar, which can decide a clutch coupling time period of a stabilizer bar when clutch coupling is required according to on a road condition and depending on a turning degree, and control a coupling position of the clutch in response to the clutch coupling time period, thereby preventing noise and vibration.

An exemplary embodiment of the present invention provides an apparatus for controlling a stabilizer bar including: a steering angular velocity detection unit configured to detect a steering angular velocity of a vehicle in operation; a steering angle detection unit configured to detect a steering angle of the vehicle; and a control unit configured to determine whether the vehicle is turning, based on the steering angular velocity information and the steering angle information of the vehicle, and perform clutch coupling by driving a clutch of a stabilizer bar having the clutch applied thereto, when it is determined that the vehicle is turning. The control unit decides a clutch coupling time period in response to an instantaneous turning velocity of the vehicle, and performs the clutch coupling in response to the decided clutch coupling time period.

The clutch applied to the stabilizer bar may include: a ball-shaped clutch coupling member; and a groove-shaped surface on which the clutch coupling member is moved while the vehicle is turning, and through which the clutch is coupled and released.

The control unit may set the clutch coupling time period to a relatively long time period to slowly couple the clutch, when the vehicle is steadily turning, and set the clutch coupling time period to a relatively short time period to rapidly couple the clutch, when the vehicle is quickly turning.

The apparatus may further include a vehicle velocity detection unit configured to detect a velocity of the vehicle, wherein the control unit determines whether the vehicle is turning, using a lookup table in which the steering angle for determining whether the vehicle is turning is set differently depending on the vehicle velocity.

The control unit may determine a road condition, and release the clutch when the road is a flat road or an off-road, but couple the clutch when the road is an anti-phase wave road on which the vehicle alternately and regularly rolls from side to side like a wave, even though the vehicle travels straight.

The control unit may perform the clutch coupling when the vehicle velocity exceeds a preset vehicle velocity even though the vehicle travels straight.

The control unit may calculate autocorrelation of lateral acceleration information of the vehicle, determine that the vehicle is traveling on an anti-phase wave road, when a value obtained by calculating the autocorrelation is equal to or greater than a designated threshold, and couple the clutch of the stabilizer bar.

When the value obtained by calculating the autocorrelation is less than the designated threshold, the control unit may determine that the road is a flat road or an off-road, and release the clutch of the stabilizer bar.

The control unit may decide the clutch coupling time period based on a lookup table in which the clutch coupling time period is preset in response to the instantaneous turning velocity or the steering angular velocity of the vehicle.

The control unit may decide a target position of the clutch in response to the clutch coupling time period decided according to the determination result indicating that the vehicle is turning, and slowly or rapidly move the position of the clutch coupling member in response to the decided target position through an actuator, wherein the target position of the clutch is a target position of the clutch coupling member for the clutch coupling.

Another exemplary embodiment of the present invention provides a method for controlling a stabilizer bar including: detecting steering angular velocity of a vehicle in operation through a steering angular velocity detection unit; detecting a steering angle of the vehicle through a steering angle detection unit; and determining, by a control unit, whether the vehicle is turning, based on the steering angular velocity information and the steering angle information, and performing clutch coupling by driving a clutch of a stabilizer bar having the clutch applied thereto, when it is determined that the vehicle is turning, wherein the control unit decides a clutch coupling time period in response to an instantaneous turning velocity of the vehicle, and performs the clutch coupling in response to the decided clutch coupling time period.

The clutch applied to the stabilizer bar may include: a ball-shaped clutch coupling member; and a groove-shaped surface on which the clutch coupling member is moved while the vehicle is turning, and through which the clutch is coupled and released.

In the performing of the clutch coupling, the control unit may set the clutch coupling time period to a relatively long time to slowly couple the clutch, when the vehicle is steadily turning, and set the clutch coupling time period to a relatively short time to rapidly couple the clutch, when the vehicle is quickly turning.

The method may further include detecting the velocity of the vehicle through a vehicle velocity detection unit. The control unit may determine whether the vehicle is turning, using a lookup table in which the steering angle for determining whether the vehicle is turning is differently set depending on the vehicle velocity.

In the performing of the clutch coupling, the control unit may determine a road condition, and release the clutch when the road is a flat road or an off-road and couple the clutch when the vehicle travels on an anti-phase wave road on which the vehicle alternately and regularly rolls from side to side like a wave, even though the vehicle travels straight.

In the performing of the clutch coupling, the control unit may perform the clutch coupling when the vehicle velocity exceeds a preset vehicle velocity, even though the vehicle travels straight.

In the performing of the clutch coupling, the control unit may calculate autocorrelation of lateral acceleration information of the vehicle, determine that the vehicle is traveling on an anti-phase wave road, when a value obtained by calculating the autocorrelation is equal to or more than a designated threshold, and couple the clutch of the stabilizer bar.

In the performing of the clutch coupling, when the value obtained by calculating the autocorrelation is less than the designated threshold, the control unit may determine that the road is a flat road or an off-road road, and release the clutch of the stabilizer bar.

In order to decide the clutch coupling time period, the control unit may decide the clutch coupling time period based on a lookup table in which the clutch coupling time period is preset in response to the instantaneous turning velocity or the steering angular velocity of the vehicle.

After the clutch coupling time period is decided, the control unit may decide a target position of the clutch in response to the clutch coupling time period decided according to the determination result indicating that the vehicle is turning, and slowly or rapidly move the position of the clutch coupling member in response to the decided target position through an actuator, wherein the target position of the clutch is a target position of the clutch coupling member for the clutch coupling.

In accordance with the inventive concepts, the apparatus and method for controlling a stabilizer bar can decide the clutch coupling time period of the stabilizer bar when the clutch coupling is required according to the road condition and depending on how much the vehicle is turning, and control the coupling position of the clutch in response to the clutch coupling time period, thereby preventing noise and vibration.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
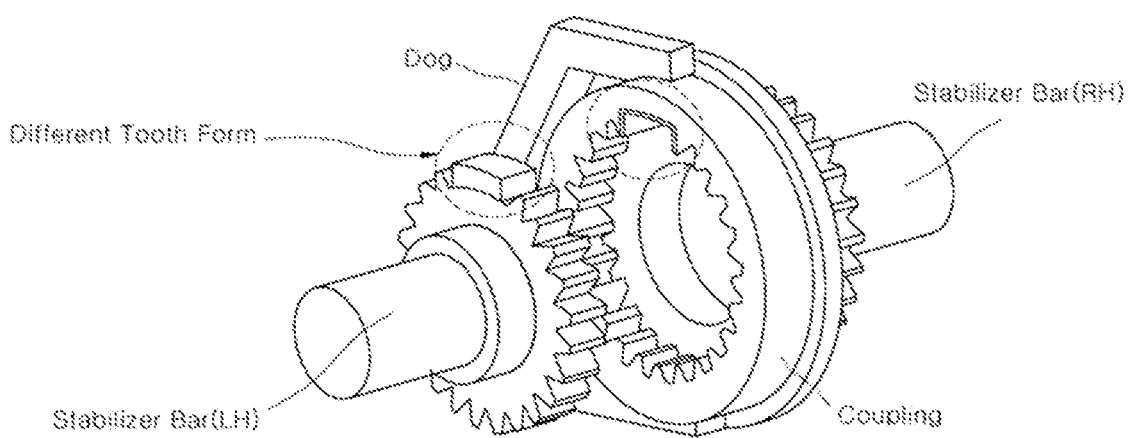
FIG. 1 is a diagram for describing a schematic shape and a problem of a conventional stabilizer bar with a clutch applied thereto.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Various advantages and features of the present invention and methods accomplishing thereof will become apparent from the following description of embodiments with reference to the accompanying drawings. However, the present invention is not be limited to the embodiments set forth herein but may be implemented in many different forms. The present embodiments may be provided so that the disclosure of the present invention will be complete, and will fully convey the scope of the invention to those skilled in the art and therefore the present invention will be defined within the scope of claims. Like reference numerals throughout the description denote like elements.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Figure 2:
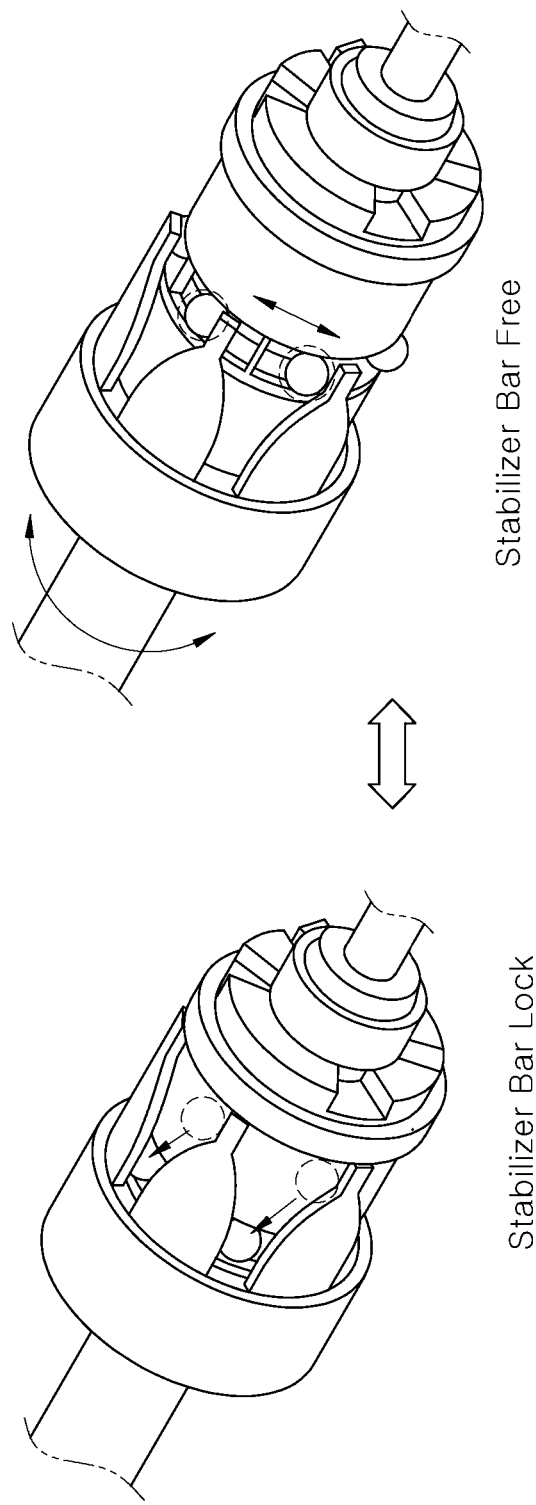
FIG. 2 is a diagram illustrating a stabilizer bar to which a ball and groove-shaped clutch is applied in relation to an exemplary embodiment of the present invention, in order to solve the problem of the stabilizer bar with a clutch applied thereto in FIG. 1.

In order to overcome the limit of the conventional stabilizer bar with a clutch applied thereto, the present applicant has suggested a stabilizer bar to which a ball and groove-shaped clutch is applied in relation to an exemplary embodiment of the present invention, as illustrated in FIG. 2. The ball and groove-shaped clutch in relation to exemplary embodiment of the present invention will be described below in detail with reference to FIGS. 7 to 19. The clutch illustrated in FIG. 2 may be coupled and released as the ball (i.e. a clutch coupling member) is moved along a groove surface while a vehicle is turning, unlike the clutch applied to the conventional stabilizer bar.

However, depending on the shape of the clutch, shock inevitably occurs between the ball and the groove when the clutch is coupled. The shock may serve as the cause of impulsive noise and vehicle vibration. Therefore, the present exemplary embodiment provides a control method for reducing impulsive noise and vibration when a clutch of a stabilizer bar to which the ball and groove-shaped clutch is applied is coupled, the clutch including a ball-shaped clutch coupling member and a groove-shaped surface on which the clutch coupling member is moved to couple and release the clutch while the vehicle is turning.

Figure 3:
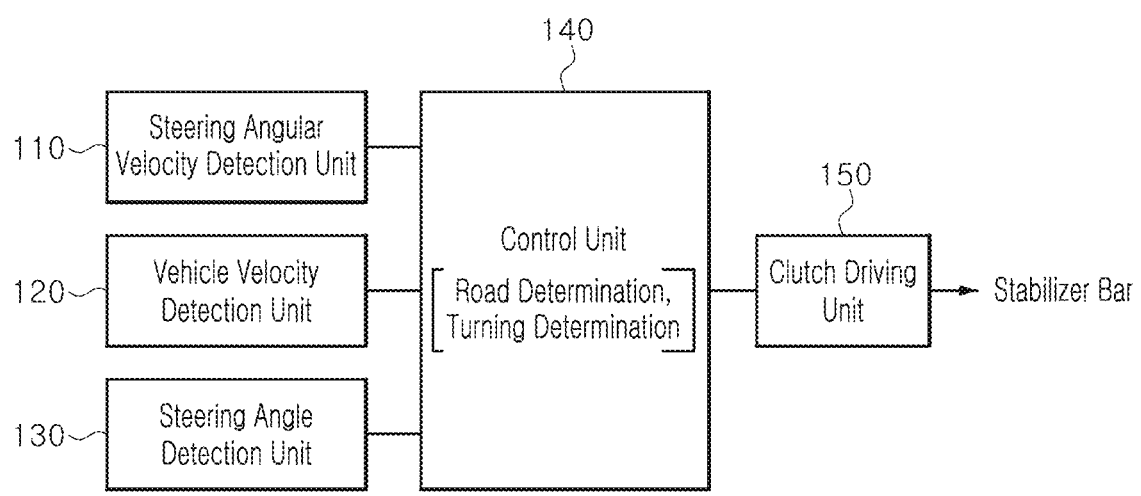
FIG. 3 is a diagram illustrating a schematic configuration of an apparatus for controlling a stabilizer bar to which a ball and groove-shaped clutch is applied, in accordance with an exemplary embodiment of the present invention.

FIG. 3 is a diagram illustrating a schematic configuration of an apparatus for controlling a stabilizer bar to which a ball and groove-shaped clutch is applied, in accordance with an exemplary embodiment of the present invention.

As illustrated in FIG. 3, the apparatus for controlling a stabilizer bar in accordance with an exemplary embodiment of the present invention includes a steering angular velocity detection unit 110, a vehicle velocity detection unit 120, a steering angle detection unit 130, a control unit 140, and a clutch driving unit 150.

The steering angular velocity detection unit 110 detects a steering angular velocity of a vehicle in operation, and outputs the detected steering angular velocity to the control unit 140.

The vehicle velocity detection unit 120 detects a vehicle velocity of the vehicle in operation, and outputs the detected vehicle velocity to the control unit 140.

The steering angle detection unit 130 detects a steering angle of the vehicle in operation, and outputs the detected steering angle to the control unit 140.

The steering angular velocity, the vehicle velocity, and the steering angle may be detected through a plurality of sensors (not illustrated) installed in the vehicle, respectively, or received through communication with an ECU (Electronic Control Unit) (not illustrated) of the vehicle.

The control unit 140 may determine whether the vehicle is turning, based on the steering angular velocity information and the steering angle information of the vehicle.

For example, when the steering angular velocity and the steering angle are equal to or greater than a preset threshold, the control unit 140 may determine that the vehicle is turning.

In the present exemplary embodiment, one constant threshold is used as the steering angular velocity information, but the steering angle required for determining whether the vehicle is turning is changed depending on the vehicle velocity information. For example, the control unit 140 significantly adjusts the steering angle such that the vehicle can make a turn, when the vehicle travels at low velocity, and slightly adjusts the steering angle such that the vehicle can make a turn, when the vehicle travels at high velocity.

That is, in the case of the steering angle information, the steering angle for determining whether the vehicle is turning is changed depending on the vehicle velocity. Therefore, the threshold for determining whether the vehicle is turning is preset through a map or lookup table based on vehicle velocity.

For example, since the steering angle required for turning is large at low velocity and small at high velocity, such a characteristic is reflected into the map or lookup table. Furthermore, when the two kinds of vehicle signals (for example, steering angular velocity and steering angle) are equal to or greater than the preset threshold, the control unit 140 determines that the vehicle is turning.

When determining that the vehicle is turning, the control unit 140 drives the clutch of the stabilizer bar through the clutch driving unit 150. That is, when determining that the vehicle is turning, the control unit 140 couples the clutch of the stabilizer bar.

The control unit 140 determines a road condition, and releases the clutch when the road is a flat road or off-road. When the vehicle travels on a wave road (for example, an anti-phase wave road) where the vehicle alternately and regularly rolls from side to side like a wave even though the vehicle travels straight, the control unit 140 may couple the clutch. Furthermore, when the vehicle travels straight, the control unit 140 may also couple the clutch at a preset vehicle velocity or more.

However, when the stabilizer bar, which has been invented by the present applicant and to which the ball and the groove-shaped clutch is applied, is applied to the vehicle to perform clutch coupling in order to overcome the limit of the conventional stabilizer bar with a clutch applied thereto as described with reference to FIG. 2, noise and vehicle vibration may occur due to shock between the ball and the groove during the clutch coupling.

Therefore, the apparatus for controlling a stabilizer bar in accordance with an exemplary embodiment of the present invention decides a clutch coupling time period in response to the instantaneous turning velocity of the vehicle (i.e. the velocity at the moment that it is determined that the vehicle is turning), when the clutch of the stabilizer bar to which the ball and groove-shaped clutch is applied as illustrated in FIG. 2 is coupled, and adjusts the position of the ball of the clutch in response to the decided clutch coupling time period, thereby reducing impulsive noise and vibration which occur during the clutch coupling.

For example, the control unit 140 slowly couples the clutch (for example, a clutch coupling time period of 3 sec.) when the vehicle steadily turns, and rapidly couples the clutch (for example, the clutch coupling time period of 1 ms) when the vehicle quickly turns.

Figure 4:
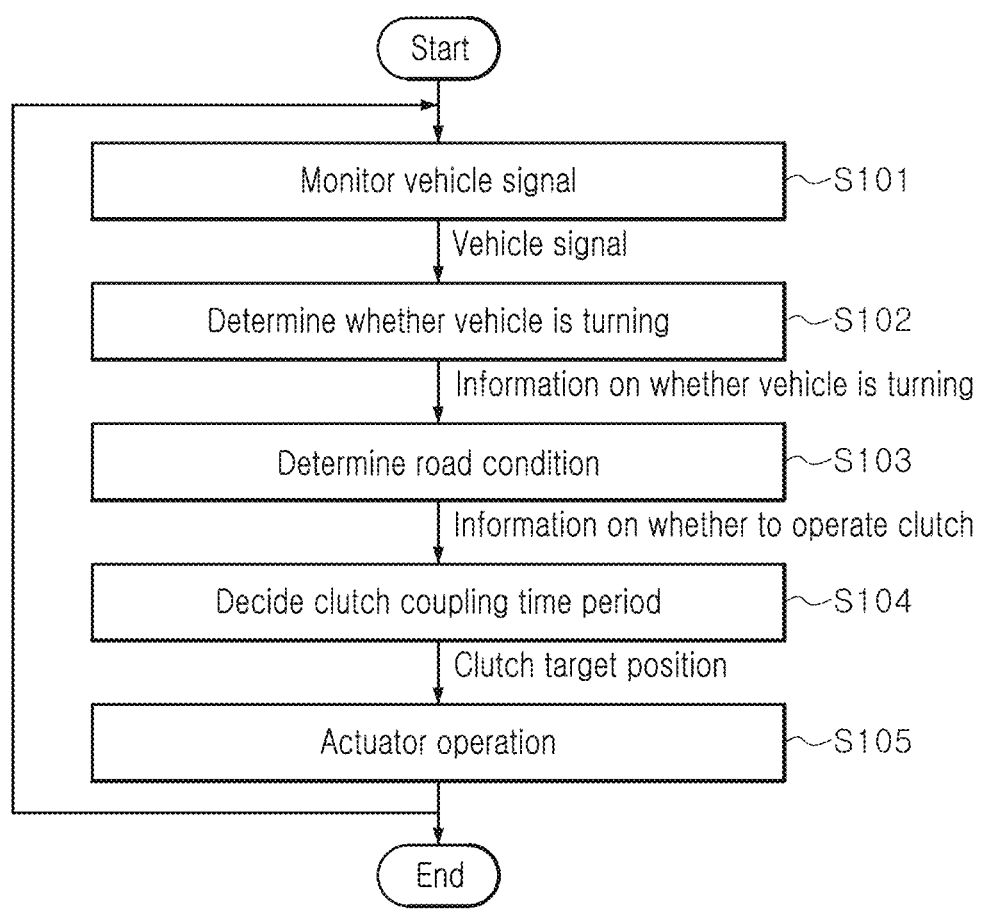
FIG. 4 is a flowchart illustrating a method for controlling a stabilizer bar to which a ball and groove-shaped clutch is applied, in accordance with an exemplary embodiment of the present invention.

FIG. 4 is a flowchart illustrating a method for controlling a stabilizer bar to which a ball and groove-shaped clutch is applied, in accordance with an exemplary embodiment of the present invention.

As illustrated in FIG. 4, the control unit 140 monitors designated vehicle signals (for example, steering angular velocity, vehicle velocity and steering angle) in step S101.

The control unit 140 determines whether the vehicle is turning, based on the vehicle signals (for example, steering angular velocity, vehicle velocity and steering angle), in step S102.

For example, when the steering angular velocity and the steering angle are equal to or more than the preset threshold, the control unit 140 may determine that the vehicle is turning. However, the determining of whether the vehicle is turning, based on the steering angle, additionally reflects the vehicle velocity information. For example, when the vehicle travels at low velocity, the control unit 140 determines that the vehicle is turning, in the case that the steering angle is significantly adjusted. However, when the vehicle travels at high velocity, the control unit 140 determines that the vehicle is turning, even in the case that the steering angle is slightly adjusted.

The control unit 140 additionally determines a road condition in step S103 after determining whether the vehicle is turning.

Figure 5:
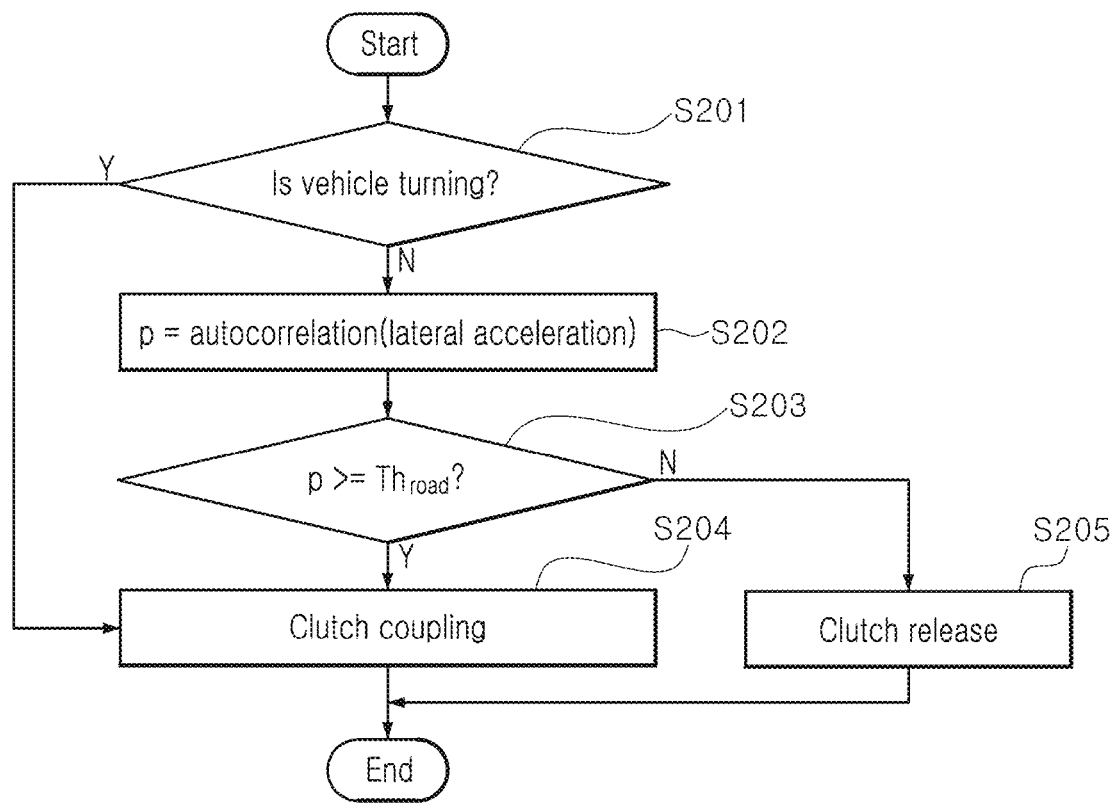
FIG. 5 is a flowchart illustrating a method for determining a road condition to couple or release the clutch of the stabilizer bar in FIG. 4.

FIG. 5 is a flowchart illustrating a method for determining a road condition to couple or release the clutch of the stabilizer bar, in FIG. 4. When it is determined that the vehicle is turning ("Yes" in step S201), the control unit 140 couples the clutch of the stabilizer bar in step S204.

However, when it is determined that the vehicle is not turning ("No" in step S201), the control unit 140 calculates autocorrelation of lateral acceleration information of the vehicle in step S202. When a result value p obtained by calculating the autocorrelation is equal to or more than a designated threshold $Th_{road}$ ("Yes" in step S203), the control unit 140 couples the clutch of the stabilizer bar in step S204.

The threshold $Th_{road}$ indicates autocorrelation of lateral acceleration information which is set to determine whether the road is a wave road (for example, an anti-phase wave road) where the vehicle regularly and alternately rolls from side to side like a wave.

When the result value p obtained by calculating the autocorrelation is less than the designated threshold $Th_{road}$ ("No" in step S203), the road is any one of a flat road and an off-road. Thus, the control unit 140 releases the clutch of the stabilizer bar in step S205.

In the present exemplary embodiment, when clutch coupling is required depending on the road even though the vehicle is not turning (for example, when the vehicle travels on an anti-phase wave road), the control unit 140 may couple the clutch of the stabilizer bar, thereby preventing an unnecessary head toss.

Referring back to FIG. 4, when the vehicle is turning or the clutch coupling is required depending on the road even though the vehicle is not turning (for example, when the vehicle travels on an anti-phase wave road), the control unit 140 decides to operate the clutch (that is, clutch coupling).

When deciding to operate the clutch (i.e. the clutch coupling), the control unit 140 decides a clutch coupling time period according to an instantaneous turning degree (instantaneous turning velocity) or the steering angular velocity in step S104.

For example, when the instantaneous turning degree (instantaneous turning velocity) is low, that is, when the vehicle is steadily turning, the control unit 140 sets the clutch coupling time period to a relatively long time (for example, 3 sec.). On the other hand, when the instantaneous turning degree (instantaneous turning velocity) is high, that is, when the vehicle is quickly turning, the control unit 140 sets the clutch coupling time period to a relatively short time (for example, 1 ms).

When the clutch coupling time period is set to a relatively long time period, the clutch coupling needs to be performed slowly. Thus, the clutch driving unit 150 (for example, actuator) slowly moves the position of the ball for the clutch coupling. On the other hand, when the clutch coupling time period is set to a relatively short time period, the clutch coupling needs to be performed rapidly. Thus, the clutch driving unit 150 rapidly moves the position of the ball for the clutch coupling.

That is, the target position of the clutch (i.e. the target position of the ball for the clutch coupling or the moving speed of the ball for the clutch coupling) is decided in response to the clutch coupling time period.

Figure 6:
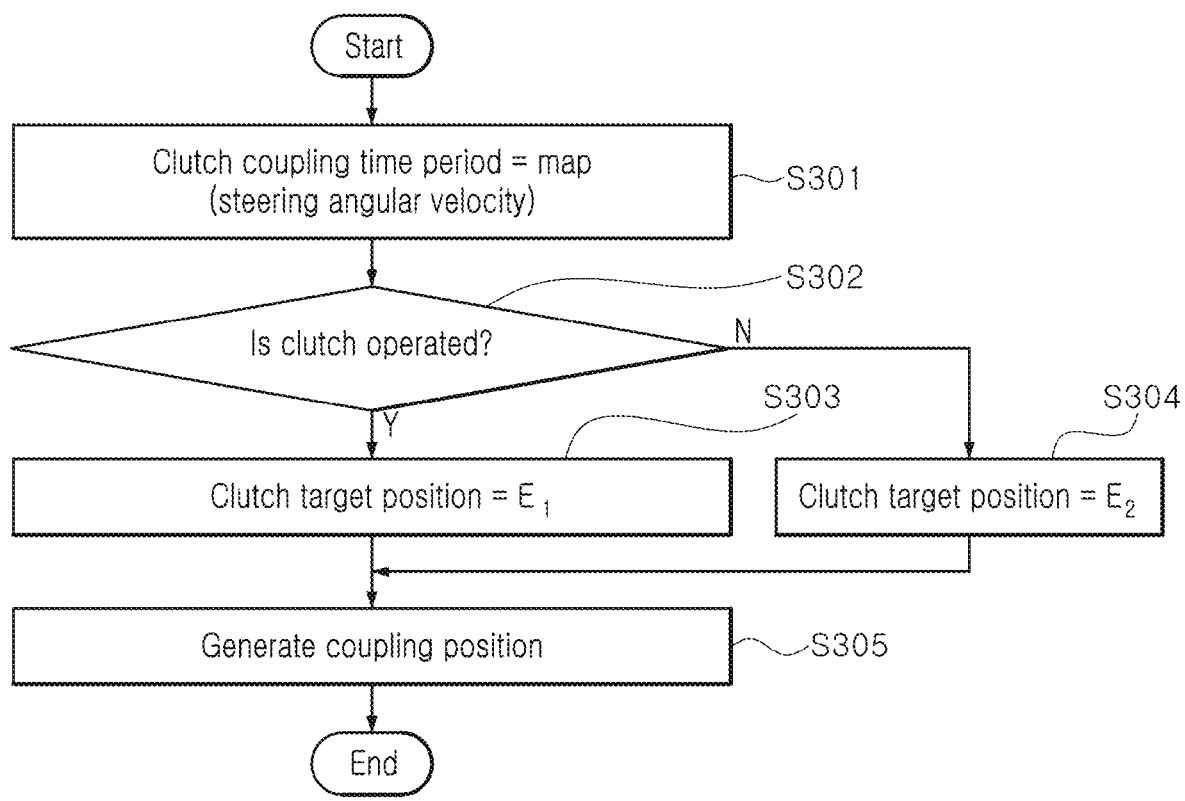
FIG. 6 is a flowchart illustrating a method for deciding a clutch position in response to a clutch coupling time period which is decided according to an instantaneous turning velocity, in FIG. 4.

FIG. 6 is a flowchart illustrating a method for deciding a clutch position in response to the clutch coupling time period which is decided according to the instantaneous turning velocity, in FIG. 4.

Referring to FIG. 6, the control unit 140 decides the clutch coupling time period based on a preset map or lookup table in response to the instantaneous turning degree (i.e. instantaneous turning velocity) or the steering angular velocity, in step S301.

When deciding to operate the clutch (i.e., the clutch coupling) according to the determination result indicating that the vehicle is turning ("Yes" in S302), the control unit 140 decides a first clutch target position (i.e., a target position of the ball for clutch coupling) $E_1$ in response to the clutch coupling time period, in step S303.

When deciding not to operate the clutch (i.e., the clutch release) according to the determination result indicating that that the vehicle is not turning ("No" in S302), the control unit 140 decides a second clutch target position (i.e., a target position of the ball for clutch release) $E_2$ in step S304.

Therefore, the clutch driving unit 150 (for example, actuator) slowly moves the position of the ball for the clutch coupling or rapidly moves the position of the ball for clutch coupling in response to the clutch target position $E_1$ which is decided when the clutch is operated, or moves the position of the ball of the clutch to the target position of the ball for clutch release in response to the clutch target position $E_2$ when the clutch is not operated, in steps S305 and S105.

The clutch coupling time period is decided within a determined range (for example, a clutch coupling time period preset by the map) in response to the current steering angular velocity.

For example, the vehicle has a low steering angular velocity when steadily turning, and has a high steering angular velocity when turning quickly. Thus, such characteristics are preset as a map for deciding the clutch coupling time period.

When deciding to operate the clutch, the control unit 140 generates a clutch coupling position such that the ball of the clutch is moved for the decided clutch coupling time period. The clutch coupling position may be applied when the clutch is not only coupled but also released, thereby preventing noise and vibration of the vehicle in more situations.

In the present exemplary embodiment, when the clutch coupling is required according to the road condition and depending on how much the vehicle is turning, the control unit 140 may decide the clutch coupling time period of the stabilizer bar, and control the coupling position of the clutch in response to the clutch coupling time period, thereby preventing noise and vibration.

Figure 7:
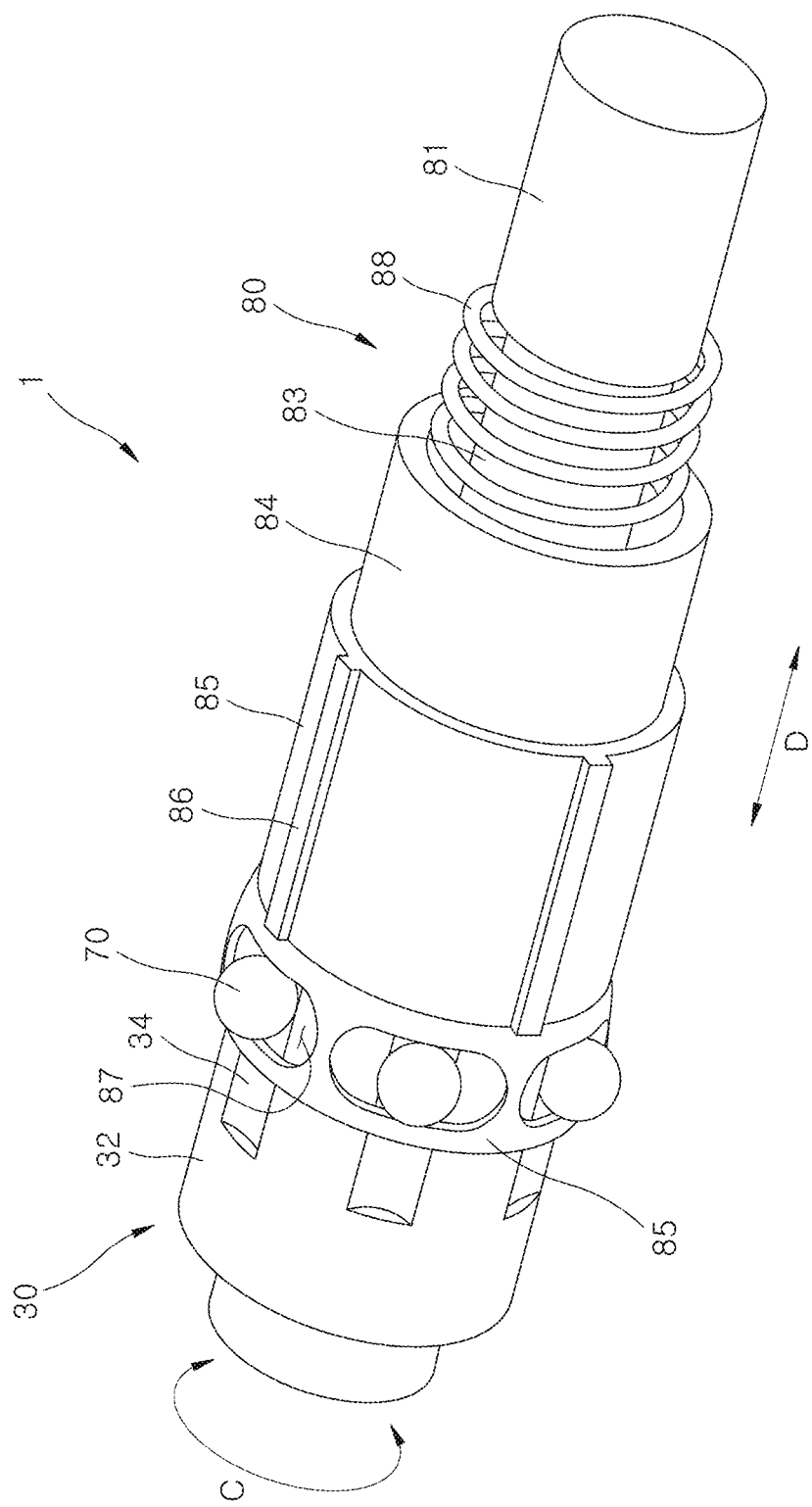
FIG. 7 is a perspective view illustrating that a ball member (or ball) is moved from one side to the other side of a first guide groove by a cage in the clutch in accordance with an exemplary embodiment of the present invention.
Figure 8:
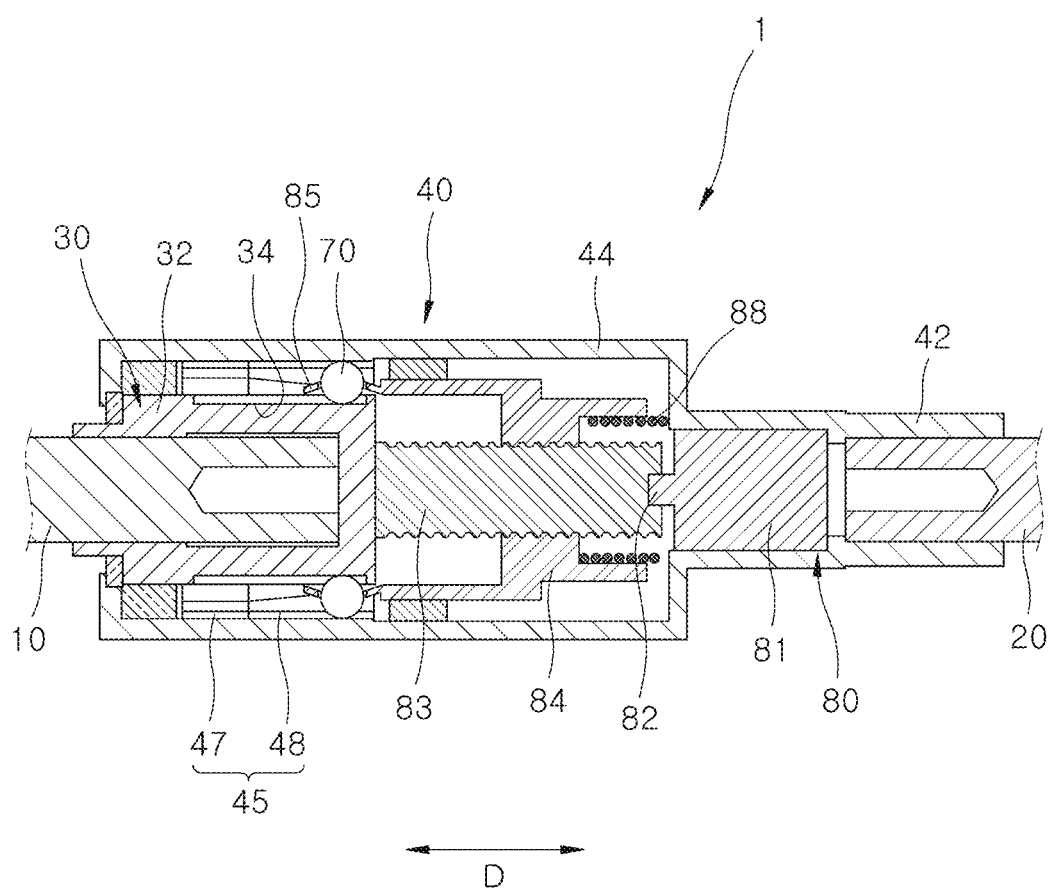
FIG. 8 is a front cross-sectional view illustrating that the ball member in accordance an exemplary embodiment of the present invention is moved to a second groove.
Figure 9:
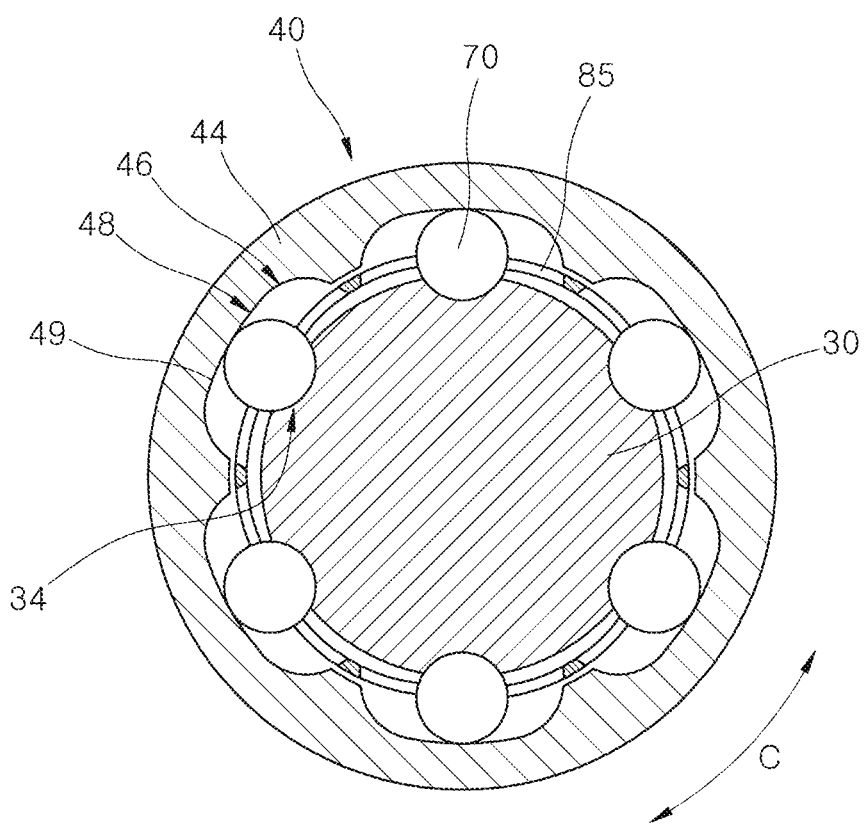
FIG. 9 is a side cross-sectional view illustrating that the ball member in accordance with an exemplary embodiment of the present invention is positioned in the second groove.
Figure 10:
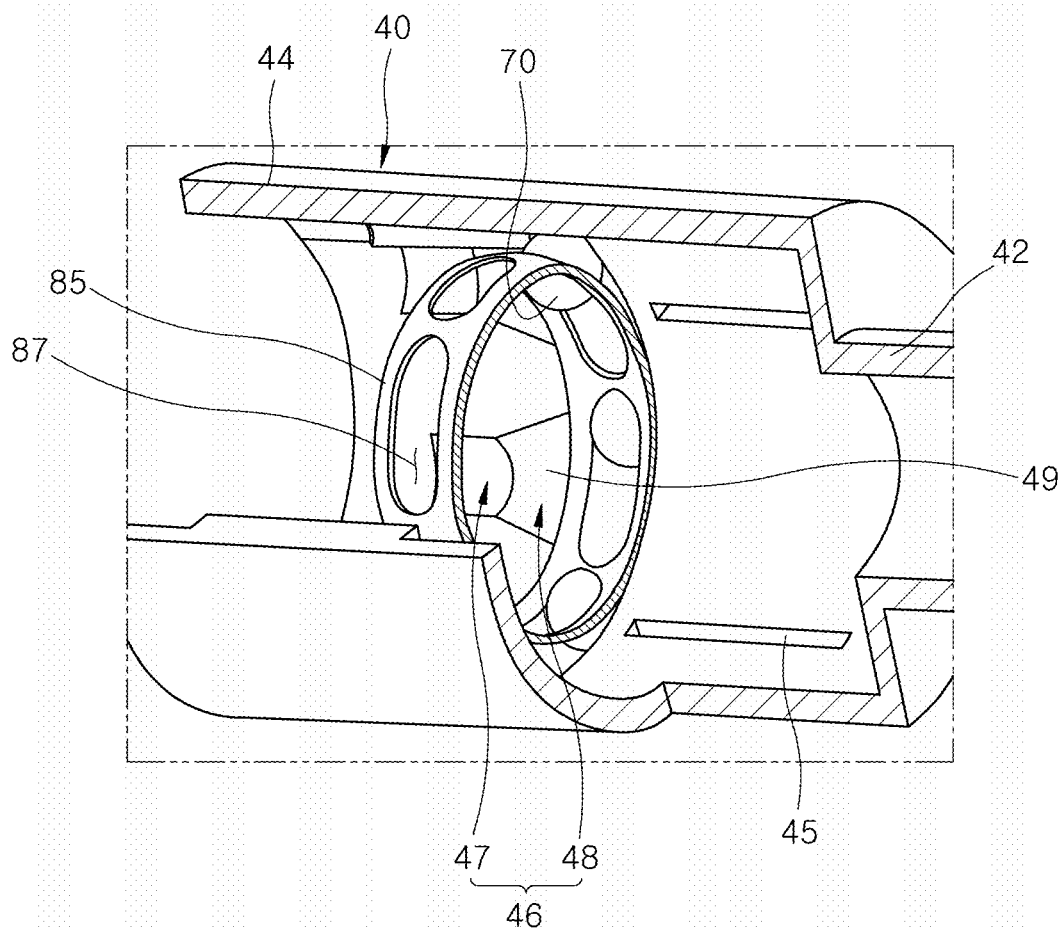
FIG. 10 is a perspective view illustrating that an angle difference occurs while the ball member in accordance with an exemplary embodiment of the present invention is positioned in the second groove.
Figure 11:
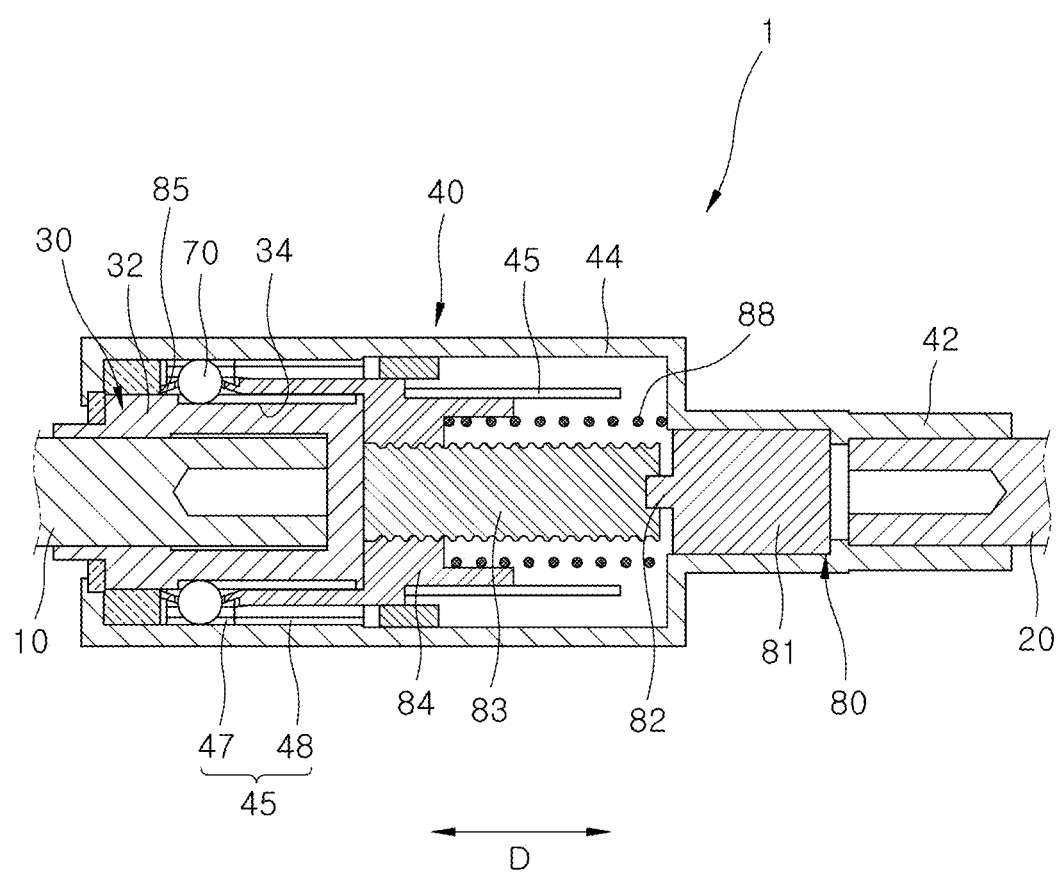
FIG. 11 is a front cross-sectional view illustrating that the ball member in accordance with an exemplary embodiment of the present invention is moved to a first groove.
Figure 12:
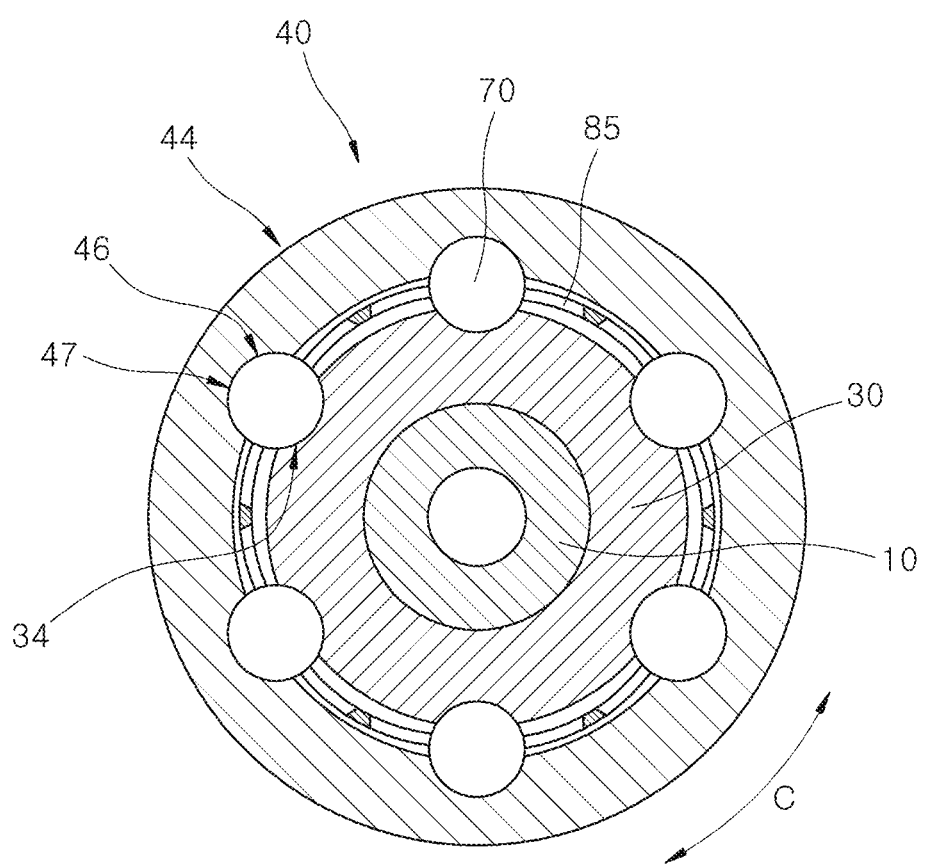
FIG. 12 is a side cross-sectional view illustrating that the ball member in accordance with an exemplary embodiment of the present invention is positioned in the first groove.
Figure 13:
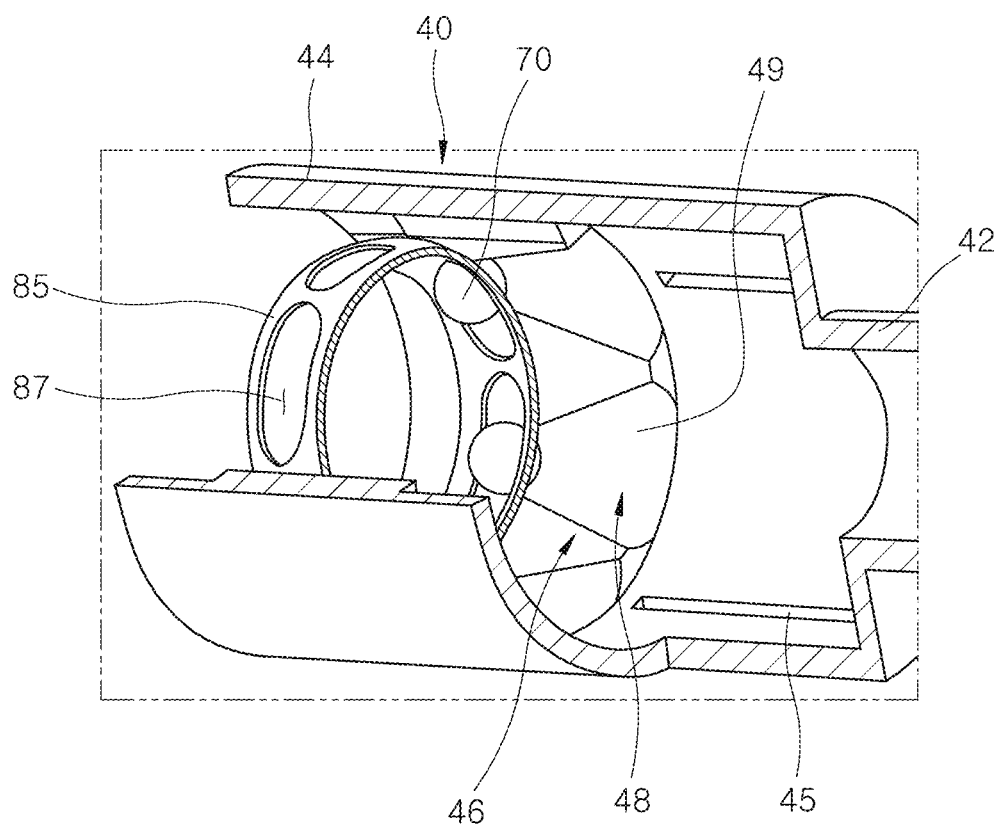
FIG. 13 is a perspective view illustrating that the ball member in accordance with an exemplary embodiment of the present invention is positioned in the first groove.
Figure 14:
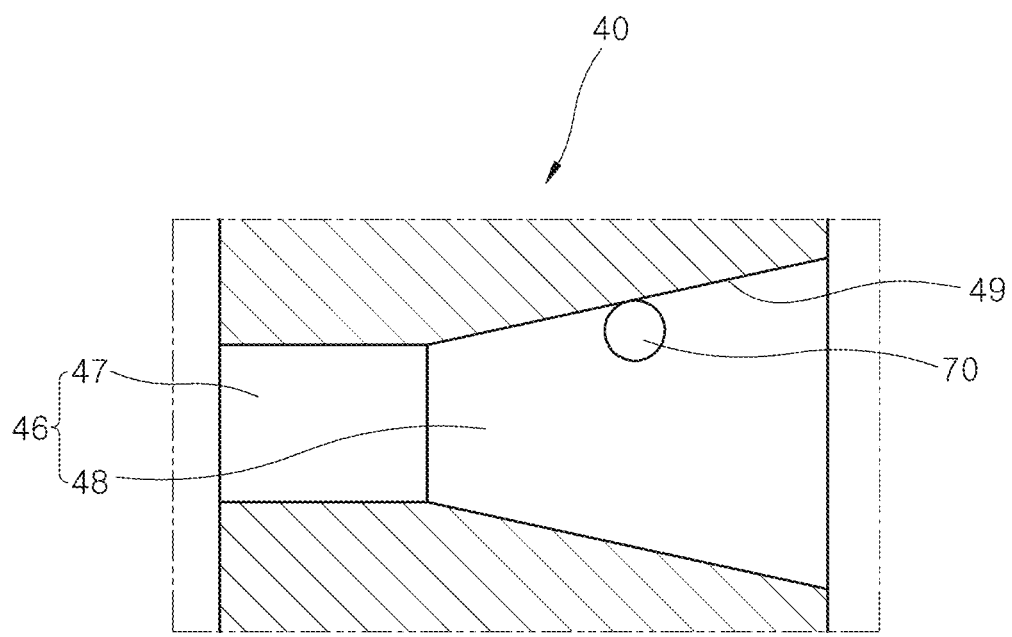
FIG. 14 is a diagram illustrating the shape of the second groove in accordance with an exemplary embodiment of the present invention.
Figure 17:
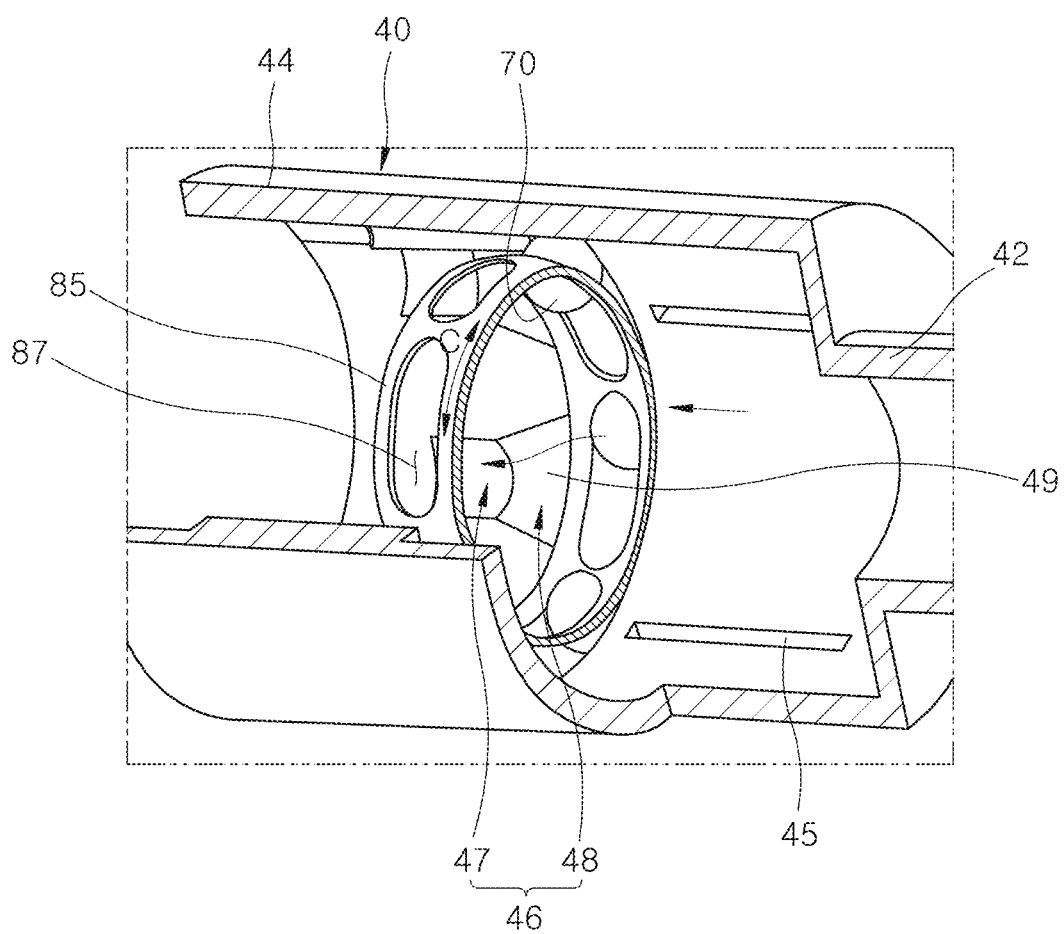
FIG. 17 is a perspective view illustrating an operation in which the ball member in accordance with an exemplary embodiment of the present invention is moved from the second groove to the first groove and engaged at the origin.
Figure 18:
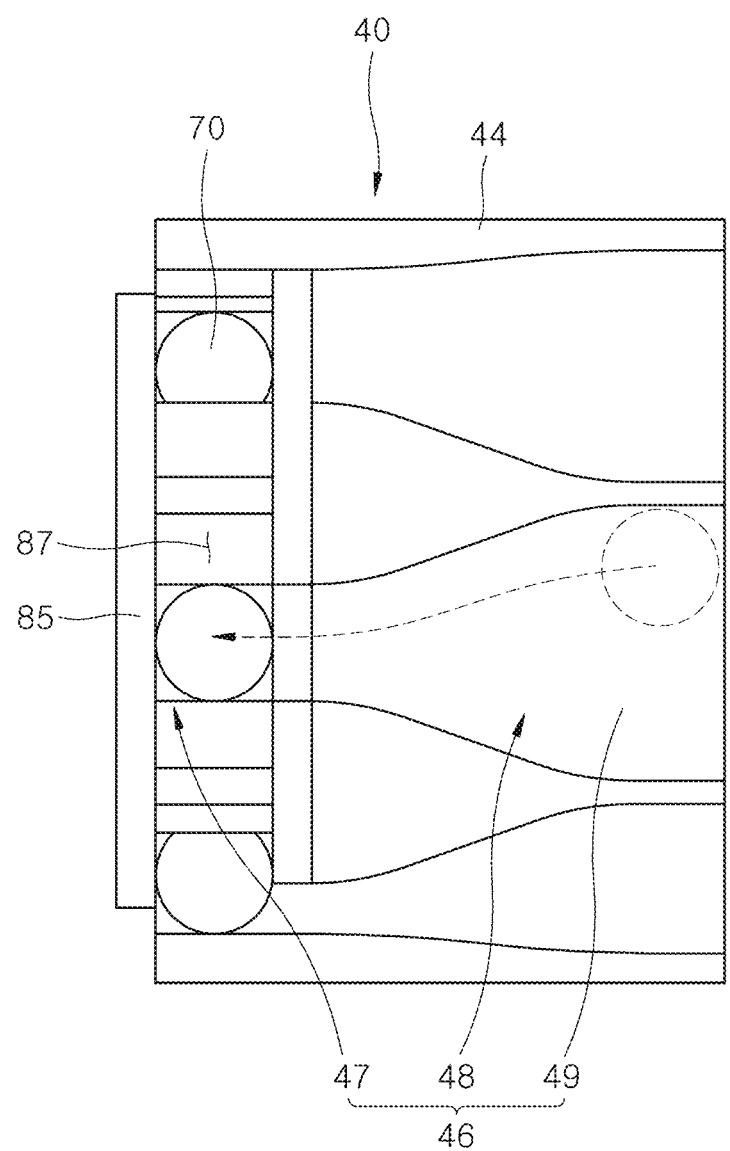
FIG. 18 is a front view illustrating the operation in which the ball member in accordance with an exemplary embodiment of the present invention is moved from the second groove to the first groove and engaged at the origin.
Figure 19:
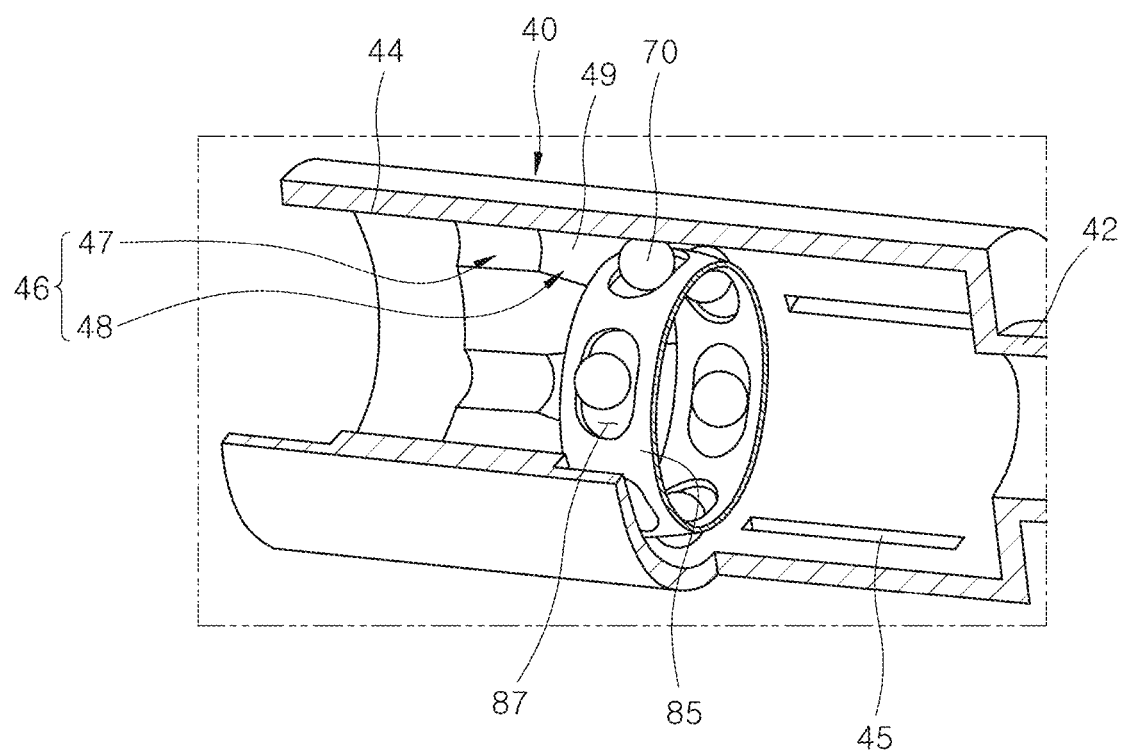
FIG. 19 is a perspective view illustrating that the ball member in accordance with an exemplary embodiment of the present invention is moved to the outside of the second groove.

FIGS. 7 to 19 are diagrams illustrating the ball and groove-shaped clutch applied to the stabilizer bar in accordance with an exemplary embodiment of the present invention. FIG. 7 is a perspective view illustrating that a ball member (or ball) is moved from one side to the other side of a first guide groove by a cage in the clutch related to an exemplary embodiment of the present invention; FIG. 8 is a front cross-sectional view illustrating that the ball member in accordance with an exemplary embodiment of the present invention is moved to a second groove; FIG. 9 is a side cross-sectional view illustrating that the ball member in accordance with an exemplary embodiment of the present invention is positioned in the second groove; FIG. 10 is a perspective view illustrating that an angle difference occurs while the ball member in accordance with an exemplary embodiment of the present invention is positioned in the second groove; FIG. 11 is a front cross-sectional view illustrating that the ball member in accordance with an exemplary embodiment of the present invention is moved to a first groove; FIG. 12 is a side cross-sectional view illustrating that the ball member in accordance with an exemplary embodiment of the present invention is positioned in the first groove; FIG. 13 is a perspective view illustrating that the ball member in accordance with an exemplary embodiment of the present invention is positioned in the first groove; FIG. 14 is a diagram illustrating the shape of the second groove in accordance with an exemplary embodiment of the present invention; FIG. 17 is a perspective view illustrating an operation in which the ball member in accordance with an exemplary embodiment of the present invention is moved from the second groove to the first groove and engaged at the origin; FIG. 18 is a front view illustrating the operation in which the ball member in accordance with an exemplary embodiment of the present invention is moved from the second groove to the first groove and engaged at the origin; and FIG. 19 is a perspective view illustrating that the ball member in accordance with an exemplary embodiment of the present invention is moved to the outside of the second groove.

As illustrated in FIGS. 7 to 10, a clutch 1 for a stabilizer in accordance with an exemplary embodiment of the present invention includes an inner race 30, a housing 40, a ball member 70 and a driver 80. The inner race 30 is fixed to a first transmission bar 10 and has a first guide groove 34 formed on the outside thereof in a longitudinal direction D. The housing 40 is fixed to a second transmission bar 20, installed in a shape to cover the outside of the inner race 30, and has a second guide groove 46 formed at a position facing the first guide groove 34. The ball member 70 is positioned between the inner race 30 and the housing 40 and has both sides inserted into and locked to the first and second guide grooves 34 and 46. The driver 80 is positioned in the housing 40, and moves the ball member 70 along the first and second guide grooves 34 and 46 to control power transmission between the inner race 30 and the housing 40.

The clutch 1 for a stabilizer in accordance with the exemplary embodiment of the present invention has a clutch structure which is used for power transmission and power interruption, and can transmit power because the ball member 70 is engaged at the origin through the second guide groove 46. During the operation in which the ball member 70 is moved along a second groove 48 and then engaged between the first guide groove 34 and a first groove 47, only a force required for moving the ball member 70 is needed. Thus, the operation may be performed by a relatively small force. The clutch 1 for a stabilizer may be used as a clutch of another power transmission device as well as the stabilizer.

As illustrated in FIG. 8, the first transmission bar 10 is positioned on one side of the clutch 1 for a stabilizer (left side in FIG. 2), and the second transmission bar 20 is positioned on the other side of the clutch 1 (right side in FIG. 2). In accordance with an exemplary embodiment, the first transmission bar 10 is a first stabilizer bar, and the second transmission bar 20 is a second stabilizer bar.

The inner race 30 is fixed to the first transmission bar 10, and has the first guide groove 34 formed on the outside thereof in the longitudinal direction D. In accordance with an exemplary embodiment, the inner race 30 includes an inner body 32 and the first guide groove 34. The inner body 32 is installed in a shape to cover an end of the first transmission bar 10. The inner body 32 has a pipe shape, and the first guide groove 34 formed on the outside of the inner body 32 is formed in a straight line shape in the longitudinal direction D of the inner body 32. Furthermore, the plurality of first guide grooves 34 are installed along the outer circumference of the inner body 32.

The inner race 30 is installed in a shape to face the housing 40 connected to the second transmission bar 20, and torque transmission is performed with the ball member 70 moved to an engagement position.

The housing 40 is fixed to the second transmission bar 20 and installed in a shape to cover the outside of the inner race 30, and the second guide groove 46 is formed at a position facing the first guide groove 34. The second guide groove 46 includes the first groove 47 having the same linear shape as the first guide groove 34 and the second groove 48 having a wider area than the first groove 47. With the ball member 70 positioned in the second groove 48, the housing 40 and the inner race 30 are not synchronized. With the ball member 70 moved to the first groove 47, the housing 40 and the inner race 30 may be synchronized to transmit power. In accordance with an embodiment, the housing 40 includes a fixed body 42, an extended body 44 and the second guide groove 46.

The fixed body 42 is fixed to the second transmission bar 20, and the extended body 44 is extended from the fixed body 42 and installed in a shape to cover the inner race 30. The extended body 44 has the second guide groove 46 formed therein to guide the ball member 70 to the position where the ball member 70 is engaged or disengaged. In accordance with an exemplary embodiment, the second guide groove 46 includes the first groove 47 and the second groove 48.

The first groove 47 is formed in a straight line shape at a position facing the first guide groove 34. The first groove 47 is formed on the inside of the housing 40, facing the first guide groove 34 of the inner race 30. The first guide groove 34 and the first groove 47 are linearly formed in the longitudinal direction D of the housing 40. Furthermore, since the first groove 47 facing the ball member 70 and the first guide groove 34 are formed in a curved shape, the first groove 47 and the first guide groove 34 are brought in surface contact with the ball member 70. Therefore, since the ball member 70 can be selectively brought in surface contact, line contact or dot contact with the inner race 30 and the housing 40 while interposed between the first groove 47 and the first guide groove 34, power transmission may be easily performed.

Since the second groove 48 is connected to the first groove 47 and formed in a fan shape, the ball member 70 positioned in the second groove 48 can be moved in a circumferential direction C. Furthermore, since a cage 85 for moving the ball member 70 has a long guide hole 87 formed in the circumferential direction C, the cage 85 and the housing 40 can be rotated with the second transmission bar 20 in the circumferential direction C. Therefore, when the ball member 70 is positioned in the second groove 48, power of the housing 40 is not transmitted to the inner race 30 through the ball member 70 even though the first and second transmission bars 10 and 20 are rotated in different directions. With the ball member 70 locked to the first groove 47 and the first guide groove 34, power is transmitted between the inner race 30 and the housing 40 through the ball member 70.

The ball member 70 is positioned between the inner race 30 and the housing 40, and formed in a ball shape of which both sides are inserted into and locked to the first and second guide grooves 34 and 46. The ball member 70 is inserted into the guide hole 87 formed in the cage 85 of the driver 80, and moved by the movement of the cage 85 in the longitudinal direction D. Since the ball member 70 is moved along the second guide groove 46, it is possible to reduce a frictional force required for engaging the inner race 30 and the housing 40 at the origin.

Various types of driving devices may be used as the driver 80, as long as the driver 80 is positioned in the housing 40 and controls power transmission between the inner race 30 and the housing 40 by moving the ball member 70 along the first and second guide grooves 34 and 46. In accordance with an exemplary embodiment, the driver 80 includes a motor member 81, a ball screw 83, a ball nut 84, the cage 85, and a pressurizing member 88.

An electric motor is used as the motor member 81, and the motor member 81 is fixed to the inside of the fixed body 42. The fixed body 42 has a pipe shape, and the second transmission bar 20 is inserted into and fixed to an end of the fixed body 42. The motor member 81 is inserted into and fixed to the inside of the fixed body 42 facing the second transmission bar 20.

The ball screw 83 is connected to an output shaft 82 of the motor member 81, and linearly moves the ball nut 84 while rotated by the operation of the motor member 81.

The ball nut 84 converts the rotation of the ball screw 83 into a linear motion. In accordance with an exemplary embodiment, the ball nut 84 is locked to the inside of the extended body 44 and restrained from rotating. Furthermore, the ball nut 84 is engaged with the ball screw 83 and linearly moved. The ball nut 84 has a gear formed on the inside thereof and corresponding to a gear formed on the outside of the ball screw 83.

The cage 85 is extended from the ball nut 84 and positioned between the extended body 44 and the inner race 30, and has the guide hole 87 into which the ball member 70 is inserted. The cage 85 and the ball nut 84 may be formed as one body, or manufactured as separate members and then assembled and connected to each other.

The guide hole 87 has a long oval shape, and the plurality of guide holes 87 are formed in the circumferential direction of the cage 85. The cage 85 extended from the ball nut 84 is installed in a shape to cover the outside of the inner race 30. The cage 85 has a guide protrusion 86 formed on the outside thereof and extended in the longitudinal direction D of the cage 85. The guide protrusion 86 may be inserted into a guide groove 45 formed in the housing 40, restrained from rotating in the circumferential direction C, and only moved linearly in the longitudinal direction D. The cage 85 has the guide hole 87 formed on one side thereof such that the ball member 70 is inserted into the guide hole 87.

In an exemplary embodiment of the present invention, the rotation of the cage 85 in the circumferential direction is constrained by the configuration in which the groove is formed in the housing 40 and the protrusion is formed on the outside of the cage 85. In another exemplary embodiment, however, the rotation of the cage 85 may be constrained by the configuration in which a protrusion is formed on the housing 40 and a groove is formed on the outside of the cage 85.

Various elastic members may be used as the pressurizing member 88, as long as the pressurizing member 88 is positioned in the housing 40 and elastically pressurizes the ball nut 84 toward the inner race 30. In accordance with an exemplary embodiment, a coil spring is used as the pressurizing member 88, and the pressurizing member 88 has one side supported by the ball nut 84 and the other side supported by the inside of the housing 40. Therefore, when the ball nut 84 is moved to the inner race 30, the load of the motor member 81 can be reduced. Even when an operation abnormality of the motor member 81 occurs, the pressurizing member 88 may pressurize the ball nut 84 toward the inner race 30 to move the ball member 70 to the first groove 47.

Since the ball member 70 is moved from the first groove 47 to the second groove 48 while the cage 85 is moved toward the motor member 81, power transmission is blocked. The ball nut 84 is moved with the cage 85 toward the motor member 81 while compressing the pressurizing member 88, and then locked by a separate locking device and constrained from moving. When no separate locking device is provided, the motor member 81 needs to continuously operate and generate torque for moving the ball nut 84.

The magnitude of the force for moving the ball member 70 is changed depending on the shape of the groove side surface 49, 52 or 62 of the second groove 48 or a second groove 50 or 60. As illustrated in FIG. 8, when the first groove 47 and the second groove 48 are connected to each other and the groove side surface 49 of the second groove 48 is inclined and extended in a linear direction, it is assumed that the ball member 70 moved to the second groove 48 can be moved by the supply of a force set to an average.

Figure 15:
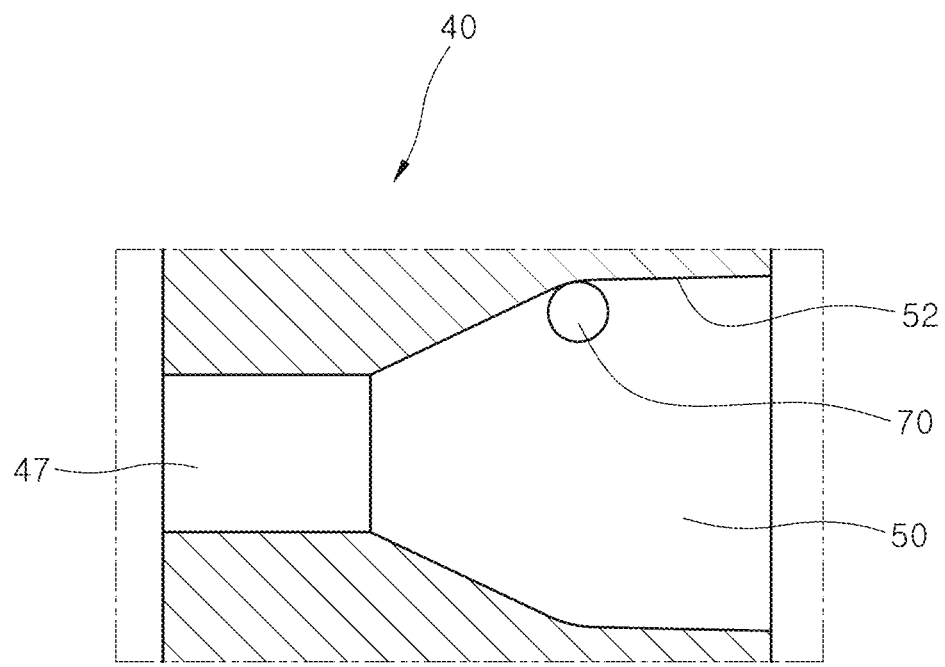
FIG. 15 is a diagram illustrating the shape of a second groove in accordance with another exemplary embodiment of the present invention.

FIG. 15 is a diagram illustrating the shape of a second groove in accordance with another exemplary embodiment of the present invention. As illustrated in FIG. 15, when the groove side surface 52 of the second groove 50 is concavely formed in the housing 40, the magnitude of a force required for moving the ball member 70 at the early stage is decreased further than when the groove side surface 49 is formed as a flat surface. At the late stage, the magnitude of the force required for moving the ball member 70 is increased.

Figure 16:
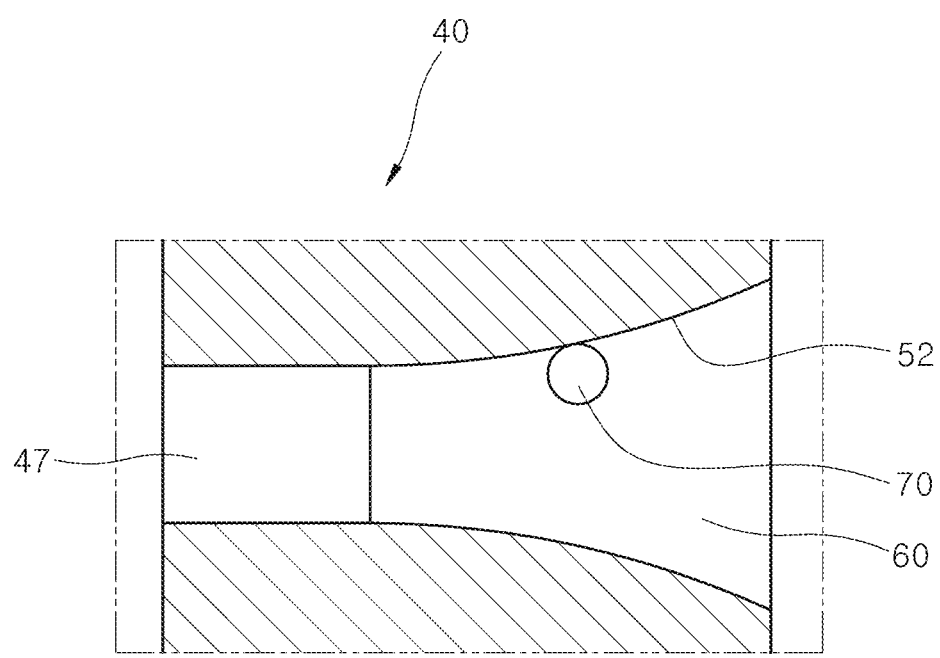
FIG. 16 is a diagram illustrating the shape of a second groove in accordance with still another exemplary embodiment of the present invention.

FIG. 16 is a diagram illustrating the shape of a second groove in accordance with still another exemplary embodiment of the present invention. As illustrated in FIG. 16, when the groove side surface 62 of the second groove 60 is convexly formed toward the inside of the housing 40, the magnitude of the force required for moving the ball member 70 at the early stage is increased further than when the groove side surface 49 is formed as a flat surface. At the late stage, the magnitude of the force required for moving the ball member 70 is decreased.

The clutch 1 for a stabilizer, which is a device for moving the ball member 70 to achieve engagement or disengagement, can minimize friction occurring during operation using the operation characteristic of the ball member 70, and adjust the force to move the ball member 70 according to the shape of the second groove 48.

Hereafter, the operation of the clutch 1 for a stabilizer in accordance with an exemplary embodiment of the present invention will be described in detail with reference to the accompanying drawings.

As illustrated in FIGS. 7 to 10 and FIG. 17, no power is transmitted between the inner race 30 and the housing 40, with the ball member 70 moved to the other end of the second groove 48. Since the second groove 48 is formed in a fan shape and the cage 85 has the long guide hole 87, the ball member 70 can be moved in the circumferential direction C.

As illustrated in FIG. 19, when the inner race 30 guides the ball member 70 to the outside of the second groove 48, the inner race 30 can freely rotate by 360 degrees with respect to the first transmission bar 10, because there is no structure to constrain the rotation of the ball member 70.

In the clutch 1 for a stabilizer in accordance with an exemplary embodiment of the present invention, the inner race 30 is fixed to the first transmission bar 10, and the second transmission bar 20 is fixed to the housing 40. However, the inventive concepts are not limited thereto, but the housing 40 may be fixed to the first transmission bar 10 and the second transmission bar 20 may be fixed to the inner race 30.

As illustrated in FIGS. 11 and 13, the motor member 81 is operated to rotate the ball screw 83, such that power is transmitted between the inner race 30 and the housing 40. The rotation of the ball screw 83 moves the ball nut 84 toward the inner race 30.

While the cage 85 connected to the ball nut 84 is moved, the ball member 70 is moved from the second groove 48 to the first groove 47. Through the ball member 70 moved to one end of the first groove 47, power is transmitted between the inner race 30 and the housing 40.

Since the first groove 47 formed in the housing 40 is formed in a straight line shape, torque can be transmitted without a large axial force, with the ball member 70 completely engaged with the first groove 47 and the first guide groove 34.

As illustrated in FIGS. 17 and 18, the ball member 70 deviates from the origin when positioned in the second groove 48, but is moved to the first groove 47 by the movement of the cage 85 and engaged with the first groove 47 at the origin. That is, since the clutch 1 for a stabilizer can perform mechanical origin compensation, a separate part such as a synchronizer is not needed, which makes it possible to reduce the manufacturing cost.

When the clutch 1 for a stabilizer is used to implement the power transmission connection/disconnection structure, the engagement can be achieved while the origin compensation is performed. In particular, since the ball member 70 is used to achieve the engagement while minimizing a frictional force, the capacity of the motor member 81 can be lowered to reduce the manufacturing cost.

The clutch 1 for a stabilizer is positioned between the first transmission bar 10 and the second transmission bar 20, and blocks power transmission when power transmission is not necessary. That is, the operation of performing disengagement when the vehicle travels straight and performing engagement when the vehicle makes a turn can improve the ride quality and turning stability.

In accordance with an exemplary embodiment of the present invention, the clutch operation in which the ball member 70 is moved from the fan-shaped second groove 48 to the line-shaped first groove 47 and engaged with the first groove 47 at the origin may be rapidly and easily performed. Furthermore, when the vehicle travels straight, the ball member 70 may be moved to the second groove 48 to block power transmission between the housing 40 and the inner race 30, and when the vehicle makes a turn, the ball member 70 may be moved to the first groove 47 to transmit power between the housing 40 and the inner race 30, which makes it possible to improve ride quality and turning stability.

Although exemplary embodiments of the present invention have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims. Furthermore, the embodiments described in this specification may be implemented with a method or process, a device, a software program, a data stream or a signal, for example. Although the embodiments have been discussed only in a single implementation context (for example, only in a method), the discussed features can be implemented in other forms (for example, device or program). The device can be implemented in proper hardware, software, firmware and the like. The method can be implemented in a device such as a processor which generally refers to a processing device including a computer, a microprocessor, an integrated circuit or a programmable logic device. The processor includes a communication device such as a computer, a cell phone, a personal digital assistant (PDA) and another device, which can facilitate communication of information between an end user and the processor.

What is claimed is:

1. An apparatus for controlling a stabilizer bar, comprising:
   a steering angular velocity detection unit configured to detect a steering angular velocity of a vehicle in operation;
   a steering angle detection unit configured to detect a steering angle of the vehicle; and
   a control unit configured to determine whether the vehicle is turning, based on the steering angular velocity information and the steering angle information of the vehicle, and perform clutch coupling by driving a clutch of a stabilizer bar having the clutch applied thereto, when it is determined that the vehicle is turning,
   wherein:
   the control unit decides a clutch coupling time period in response to an instantaneous turning velocity of the vehicle, and performs the clutch coupling in response to the decided clutch coupling time period; and
   the control unit determines a road condition, and releases the clutch when the road is a flat road or an off-road, and couples the clutch when the road is an anti-phase wave road on which the vehicle alternately and regularly rolls from side to side with a wave motion, even though the vehicle travels straight.

2. The apparatus of claim 1, wherein the clutch applied to the stabilizer bar comprises:
   a ball-shaped clutch coupling member; and
   a groove-shaped surface on which the clutch coupling member is moved while the vehicle is turning, and through which the clutch is coupled and released.

3. The apparatus of claim 1, wherein the control unit sets the clutch coupling time period to vary with a speed at which the vehicle is steadily turning.

4. The apparatus of claim 1, further comprising a vehicle velocity detection unit configured to detect a velocity of the vehicle,
   wherein the control unit determines whether the vehicle is turning, using a lookup table in which the steering angle for determining whether the vehicle is turning is set differently depending on the vehicle velocity.

5. The apparatus of claim 1, wherein the control unit performs the clutch coupling when the vehicle velocity exceeds a preset vehicle velocity even though the vehicle travels straight.

6. The apparatus of claim 1, wherein the control unit calculates autocorrelation of lateral acceleration information of the vehicle, determines that the vehicle is traveling on an anti-phase wave road, when a value obtained by calculating the autocorrelation is equal to or greater than a designated threshold, and couples the clutch of the stabilizer bar.

7. The apparatus of claim 6, wherein when the value obtained by calculating the autocorrelation is less than the designated threshold, the control unit determines that the road is a flat road or an off-road, and releases the clutch of the stabilizer bar.

8. The apparatus of claim 1, wherein the control unit decides the clutch coupling time period based on a lookup table in which the clutch coupling time period is preset in response to the instantaneous turning velocity or the steering angular velocity of the vehicle.

9. The apparatus of claim 8, wherein:
   the control unit decides a target position of the clutch in response to the clutch coupling time period decided according to the determination result indicating that the vehicle is turning, and slowly or rapidly moves the position of the clutch coupling member in response to the decided target position through an actuator; and
   the target position of the clutch is a target position of the clutch coupling member for the clutch coupling.

10. A method for controlling a stabilizer bar, comprising:
    detecting steering angular velocity of a vehicle in operation through a steering angular velocity detection unit;
    detecting a steering angle of the vehicle through a steering angle detection unit; and
    determining, by a control unit, whether the vehicle is turning, based on the steering angular velocity information and the steering angle information, and performing clutch coupling by driving a clutch of a stabilizer bar having the clutch applied thereto, when it is determined that the vehicle is turning,
    wherein:
    the control unit decides a clutch coupling time period in response to an instantaneous turning velocity of the vehicle, and performs the clutch coupling in response to the decided clutch coupling time period; and
    in the performing of the clutch coupling,
    the control unit determines a road condition, and releases the clutch when the road is a flat road or an off-road and couples the clutch when the vehicle travels on an anti-phase wave road on which the vehicle alternately and regularly rolls from side to side with a wave motion, even though the vehicle travels straight.

11. The method of claim 10, wherein in the performing of the clutch coupling,
    the control unit sets the clutch coupling time period to vary with a speed at which the vehicle is steadily turning.

12. The method of claim 10, further comprising detecting the velocity of the vehicle through a vehicle velocity detection unit,
    wherein the control unit determines whether the vehicle is turning, using a lookup table in which the steering angle for determining whether the vehicle is turning is set differently depending on the vehicle velocity.

13. The method of claim 10, wherein in the performing of the clutch coupling,
    the control unit performs the clutch coupling when the vehicle velocity exceeds a preset vehicle velocity, even though the vehicle travels straight.

14. The method of claim 10, wherein in the performing of the clutch coupling, the control unit calculates autocorrelation of lateral acceleration information of the vehicle, determines that the vehicle is traveling on an anti-phase wave road, when a value obtained by calculating the autocorrelation is equal to or more than a designated threshold, and couples the clutch of the stabilizer bar.

15. The method of claim 14, wherein in the performing of the clutch coupling,
when the value obtained by calculating the autocorrelation is less than the designated threshold, the control unit determines that the road is a flat road or an off-road, and releases the clutch of the stabilizer bar.

16. The method of claim 10, wherein in order to decide the clutch coupling time period, the control unit decides the clutch coupling time period based on a lookup table in which the clutch coupling time period is preset in response to the instantaneous turning velocity or the steering angular velocity of the vehicle.

17. The method of claim 16, wherein:
after the clutch coupling time period is decided, the control unit decides a target position of the clutch in response to the clutch coupling time period decided according to the determination result indicating that the vehicle is turning, and slowly or rapidly moves the position of the clutch coupling member in response to the decided target position through an actuator; and
the target position of the clutch is a target position of the clutch coupling member for the clutch coupling.

* * * * *